Patented Mar. 25, 1941

2,235,884

UNITED STATES PATENT OFFICE 2,235,884

ETHERS OF TRIMETHYL-HYDROQUINONE AND PROCESS OF PREPARING THE SAME

Walter John, Gottingen, and Otto Dalmer, Darmstadt, Germany, assignors to Merck & Co., Inc., Rahway, N. J., a corporation of New Jersey No Drawing. Application June 28, 1938, Serial No. 216,310. In Germany July 1, 1937

11 Claims. (Cl. 260—613)

This invention relates to ethers of trimethylhydroquinone and to processes of preparing the same, and more particularly to mono-ethers of trimethylhydroquinone having the formula $C_6H(CH_3)_3(OH)OR$, wherein R is a member selected from the group consisting of an alkyl radical, an alkylene radical, and a hydroaromatic radical.

The mono-ethers of the above type may be prepared in various ways, for example by reacting trimethylhydroquinone with an alkyl halide, an alkylene halide, or a hydroaromatic radical halide, preferably in an alkaline solution such as an alcoholic alkaline or an acetonic alkaline solution. The esters of the alcohols, for example, the toluene sulfonates, can be likewise reacted with trimethylhydroquinone to form the desired ethers. Also, the direct condensation of the alcohol with trimethylhydroquinone may be effected in the presence of acids. The desired mono-ethers may also be obtained by etherifying a mono-acyl trimethylhydroquinone, for example the mono-acetyl compound, and subsequently removing the acyl group by saponification.

The starting alcohols or the derivatives thereof may be obtained from natural or synthetic sources, and best results are obtained with those containing from 15 to 25 carbon atoms. As examples of the same may be mentioned 1-cyclopentyl-dodecyl-12-carbinol, which may be obtained from dihydrochaulmoogric acid, the alcohols derived from perhydro vitamin A, civetone, or muscone, the alcohol having the formula $C_{19}H_{37}OH$, cetyl alcohol, octadecanol, phytol, dihydrophytol, nona-decyl alcohol, etc.

Theoretically, there are formed two different mono-ethers of the trimethylhydroquinone for each alcohol, but in different quantities, because trimethylhydroquinone is an unsymmetrical compound. It is not possible to determine which of the two possible ethers result as the basic product, because no mono-ethers and mono-esters of trimethylhydroquinone with fully explained structure are known, which can be used for comparative purposes.

In the preparation of the mono-ethers according to the present invention, di-ethers often result as by-products. The two ethers can be easily separated from each other because of their different solubility in organic solvents. After separation of the ethers, the di-ether may be treated with an agent capable of cleaving it into a mono-ether, for example aluminum chloride, acid salts, such as potassium bi-sulfate, acid halides, anilene hydrochloride, etc. In each individual case of cleavage to the mono-ether, the best possible reaction conditions should be determined by a series of comparative tests, such as the determination of the quantity or concentration of the cleavage agent, temperature, etc. In general, the cleavage can be effected by refluxing a solution of the di-ether in a solvent such as benzene, in the presence of anhydrous aluminum chloride, and recovering the mono-ether by distillation.

The following examples illustrate a method of carrying out the present invention, but it is understood that the examples are by way of illustration and not of limitation.

*Examples*

I. 7.6 g. of trimethylhydroquinone (M. P. 169° C.) and 20 g. of octadecyl bromide are dissolved in 50 cc. of absolute alcohol and heated to the boiling point. A current of an inert gas is conducted through the solution while stirring, and about 50 cc. of N alcoholic potassium hydroxide are added drop by drop, requiring about two hours. The temperature of the reaction mixture is then held at 90° C. for another five hours. Upon cooling, the whole solidifies to a crystalline mash, which is filtered while excluding the atmospheric oxygen. This residue, and the residue obtained upon further concentration of the liquid, is washed with water to remove potassium bromide, and is then dissolved in warm acetic acid. Upon cooling, the by-product trimethylhydroquinone-di-octadecyl ether $C_{45}H_{84}O_2$ (M. P. 72° C.), first separates out, and is removed. Then the trimethylhydroquinone-mono-octadecyl ether crystallizes out. Traces of any remaining trimethylhydroquinone-di-octadecyl ether are removed therefrom by repeated fractional crystallization from acetic acid. The trimethylhydroquinone-mono-octadecyl ether has a melting point of 92° C., and analysis shows the empirical formula $C_{27}H_{48}O_2$. When treated with cyanic acid in the known manner, it yields a well crystallized allophanate, trimethylhydroquinone - mono - octadecyl ether allophanate, $C_{29}H_{50}O_4N_2$, melting point 180° C.

II. 7.6 g. of trimethylhydroquinone in 50 cc. absolute alcohol are mixed with 17.4 g. of nonadecyl-bromide (M. P. 39° C.) and heated to 85° C. with stirring and while passing nitrogen through. 50 cc. of normal alcoholic potash lye are slowly added over a period of about 2 hours, and the reaction mixture is kept at 85° C. for a further 3 hours. Upon cooling, the entire mixture solidifies to a crystal mash which is sucked off and thoroughly washed with water. The filter residue is redissolved in acetic ester. The slightly soluble trimethylhydroquinone-di-nonadecyl ether ($C_{47}H_{88}O_2$) first separates out, having a melting point of 66° C., and then the trimethylhydroquinone-mono-nonadecyl ether ($C_{28}H_{50}O_2$), is further purified by repeated redissolution and fractionated crystallization. The trimethylhydroquinone-mono-nonadecyl ether crystallizes in globular form, melting at 86° C. By treatment with cyanic acid in the known manner, it yields an allophanate, having a melting point of 176° C. and the composition $C_{30}H_{52}O_4N_2$.

The mono-ethers of the present invention have striking physical and chemical properties. In spite of their phenolic nature, they are insoluble in alkali, and in general possess very weak phenolic properties. Generally speaking, they are crystalline and can be distilled in high vacuum. Chemically, they are characterized by strong reducing action. For example, in alcohol solution with gentle warming, silver nitrate is reduced to metallic silver. They possess valuable therapeutic properties. And physiologically, they control sex functions. For example the so-called "resorption sterility" of female rats is overcome by the addition of the ether to the diet of the animals.

III. 1-cyclopentyl-dodecyl-12-carbinol (Dihydrochaulmoogrylalcohol) is easily prepared by reduction of the ethyl-ester of dihydrochaulmoogric acid, according to Bouveault, with sodium and alcohol. By bromination of this alcohol which has a melting point of 40° C. with phosphorous tribromide in toluol one gets the dihydrochaulmoogrylbromide of B. P. $_{2.5\ mm.}$=192–194° C. and M. P. 24–25° C.

To a solution of 16.6 gm. of this bromide and 7.6 g. trimethylhydroquinone (M. P.=169° C.), 50 c. c.

$$\frac{N}{1}$$

alcoholic caustic potash solution are slowly added at 85° C., with stirring and passing through it a current of an inactive gas. After the alkali has all been added in about 2 hours, the reaction mixture is maintained a further 3 hours at 85°. On cooling a crystalline mass is deposited which is filtered off under vacuum (with exclusion of air). The filter residue is removed from the potassium bromide resulting from the reaction by treatment with water and is recrystallised from ethyl acetate. The difficultly soluble fraction separates out first as a by-product, which is trimethylhydroquinone - dihydrochaulmoogryldiether, $C_{45}H_{80}O_2$, M. P.=50°. By further fractional crystallisation a substance of M. P. 61° C. is isolated which possesses as shown by its composition the formula of trimethylhydroquinone-dihydrochaulmoogryl-mono-ether $C_{27}H_{46}O_2$. Yield 1.5 gm. A single treatment with 50 mg. of this monoether is sufficient to remove the absorption sterility of female rats fed on a vitamin E free diet. With cyanuric acid it produces an allophanate, trimethylhydroquinone - dihydrochaulmoogryl-mono-ethyl allophanate $C_{29}H_{48}O_4N_2$ of M. P.= 174° C.

Modifications may be made without departing from the spirit and scope of the invention, and we are to be limited only by the appended claims.

We claim:

1. Compounds of the formula $C_6H(CH_3)_3(OH)OR$ wherein R is a member selected from the group consisting of an alkyl radical, an alkylene radical, and a hydroaromatic radical, such radicals being derived from a member of the group consisting of aliphatic saturated alcohols, aliphatic unsaturated alcohols, and hydroaromatic alcohols, containing from 15 to 25 carbon atoms.

2. The compound of the formula $C_6H(CH_3)_3(OH)OC_{18}H_{37}$

3. The process comprising reacting trimethylhydroquinone with a member of the group consisting of aliphatic saturated alcohols, aliphatic unsaturated alcohols, and hydroaromatic alcohols, containing from 15 to 25 carbon atoms, and esters and halides thereof.

4. The process according to claim 3, in which the reaction is carried out in an alkaline solution.

5. The process comprising reacting trimethylhydroquinone with octadecyl-bromide in the presence of an alkaline solution.

6. The process comprising reacting trimethylhydroquinone with octadecyl-bromide in the presence of an alkaline solution, separating the di-ether from the mono-ether formed by the reaction, reacting the di-ether with an agent capable of cleaving the di-ether into a mono-ether, and recovering the mono-ether.

7. The process comprising reacting trimethylhydroquinone with octadecyl-bromide, separating the di-ether from the mono-ether formed by the reaction, treating the di-ether with anhydrous aluminum chloride, and recovering the mono-ether formed by the latter reaction.

8. The compound of the formula $C_6H(CH_3)_3(OH)OC_{19}H_{39}$

9. The compound of the formula $C_6H(CH_3)_3(OH)OC_{18}H_{35}$

10. The process comprising reacting trimethylhydroquinone with nona-decyl bromide in the presence of an alkaline solution.

11. The process comprising reacting trimethylhydroquinone with dihydrochaulmoogryl bromide in the presence of an alkaline solution.

WALTER JOHN.
OTTO DALMER.